United States Patent
Bruner et al.

(10) Patent No.: US 10,140,271 B2
(45) Date of Patent: Nov. 27, 2018

(54) DYNAMIC ADAPTATION OF A NARRATIVE ACROSS DIFFERENT TYPES OF DIGITAL MEDIA

(71) Applicant: Telltale, Incorporated, San Rafael, CA (US)

(72) Inventors: Kevin Bruner, San Rafael, CA (US); Zacariah Litton, San Pablo, CA (US)

(73) Assignee: Telltale, Incorporated, San Rafael, CA (US)

( * ) Notice: Subject to any disclaimer, the term of this patent is extended or adjusted under 35 U.S.C. 154(b) by 238 days.

(21) Appl. No.: 14/971,033

(22) Filed: Dec. 16, 2015

(65) Prior Publication Data

US 2017/0177553 A1  Jun. 22, 2017

(51) Int. Cl.
   *G06F 17/24*   (2006.01)
   *G06F 17/30*   (2006.01)
   *G06F 17/21*   (2006.01)
   *H04L 29/08*   (2006.01)

(52) U.S. Cl.
   CPC ............ *G06F 17/24* (2013.01); *G06F 17/211* (2013.01); *G06F 17/30528* (2013.01); *H04L 67/1095* (2013.01)

(58) Field of Classification Search
   CPC ................................................ G06F 17/30598
   See application file for complete search history.

(56) References Cited

U.S. PATENT DOCUMENTS

| | | | |
|---|---|---|---|
| 5,607,356 A | 3/1997 | Schwartz | |
| 7,007,295 B1 | 2/2006 | Rose et al. | |
| 8,025,562 B2 | 9/2011 | Walker et al. | |
| 8,702,517 B2 | 4/2014 | Walker et al. | |
| 8,753,183 B2 | 6/2014 | Davison et al. | |
| 8,826,357 B2 | 9/2014 | Fink et al. | |
| 2007/0011718 A1 | 1/2007 | Nee, Jr. | |
| 2007/0181677 A1 | 8/2007 | Al-Qabandi | |
| 2008/0304808 A1* | 12/2008 | Newell | G06F 17/30029 386/278 |
| 2012/0190446 A1 | 7/2012 | Rogers | |
| 2012/0236201 A1* | 9/2012 | Larsen et al. | H04N 7/088 |
| 2013/0094830 A1* | 4/2013 | Stone | H04N 5/775 386/230 |
| 2013/0097643 A1 | 4/2013 | Stone et al. | |
| 2013/0109453 A1 | 5/2013 | Holder et al. | |
| 2013/0116022 A1 | 5/2013 | Davison et al. | |

(Continued)

*Primary Examiner* — James J Debrow
(74) *Attorney, Agent, or Firm* — Fountainhead Law Group P.C.

(57) ABSTRACT

Techniques for dynamically adapting the presentation of a narrative to a user across a plurality of digital media are provided. In one embodiment, a computer system can maintain a narrative state for the narrative and, upon request, transmit a copy of the narrative state to a first digital medium client operated by the user. The first digital medium client can be configured to present the narrative to the user via a first digital medium in the plurality of digital media. Upon receiving the copy of the narrative state, the first digital medium client can adapt, based on the copy of the narrative state and one or more first rules, its presentation of the narrative to the user via the first digital medium. The first digital medium client can then update the copy of the narrative state based on portions of the narrative consumed by the user and transmit the updated copy to the computer system.

20 Claims, 4 Drawing Sheets

(56) References Cited

U.S. PATENT DOCUMENTS

| | | |
|---|---|---|
| 2014/0040956 A1 | 2/2014 | Cho et al. |
| 2015/0100578 A1* | 4/2015 | Rosen ............... G06F 17/30598 |
| | | 707/737 |
| 2015/0181272 A1 | 6/2015 | Lu et al. |
| 2015/0201242 A1 | 7/2015 | Belton |
| 2016/0124930 A1* | 5/2016 | Dhawan et al. ........ G06F 17/24 |

* cited by examiner

DYNAMIC ADAPTATION OF A NARRATIVE ACROSS DIFFERENT TYPES OF DIGITAL MEDIA

BACKGROUND

In recent years, advances in digital technology have given rise to a form of narrative expression known as digital storytelling. Although similar in many respects to traditional oral/written storytelling, digital storytelling makes use of digital media, rather than simply the spoken or printed word, to convey a story (i.e., narrative) to an audience. By leveraging the capabilities of digital media and their underlying technology platforms, digital storytelling can provide a user experience that is more interactive and immersive than traditional storytelling approaches.

As the types of digital media made available to users has grown, it has become increasingly common for content creators involved in digital storytelling to produce "hybrid-media" narratives—in other words, stories that are conveyed via a multitude of different media, rather than via a single medium. Since these hybrid-media narratives can engage users from multiple touchpoints, they have the potential to further increase user exposure to, and immersion in, the narrative content.

Unfortunately, existing approaches for implementing a hybrid-media narrative are limited in the sense that they do not provide a mechanism for user consumption of, or interaction with, the narrative in the context of one medium to affect the presentation of that narrative to the user in another medium. Thus, while the narrative can be consumed via different media, the user experience with respect to each medium is essentially a "silo-ed" (i.e., separate and isolated) experience.

SUMMARY

Techniques for dynamically adapting the presentation of a narrative to a user across a plurality of digital media are provided. In one embodiment, a computer system can maintain a narrative state for the narrative and, upon request, transmit a copy of the narrative state to a first digital medium client operated by the user. The first digital medium client can be configured to present the narrative to the user via a first digital medium in the plurality of digital media. Upon receiving the copy of the narrative state, the first digital medium client can adapt, based on the copy of the narrative state and one or more first rules, its presentation of the narrative to the user via the first digital medium. The first digital medium client can then update the copy of the narrative state based on portions of the narrative consumed by the user and transmit the updated copy to the computer system.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present disclosure provide techniques for dynamically adapting the presentation of a narrative to a user across different types of digital media (e.g., a video game, a digitally-streamed film or episodic series, an electronic book, a web site, a virtual reality (VR) world, etc.). More specifically, these techniques can modify what portions of, and/or the manner in which, the narrative is conveyed to the user via one digital medium based on the narrative portions that have already been consumed by the user via one or more other digital mediums. With this solution, the user can experience the narrative in a cohesive, connected, and consistent manner across the various media types through which the narrative is made available.

These and other aspects of the present disclosure are described in further detail in the sections that follow.

1. System Environment

Figure 1:
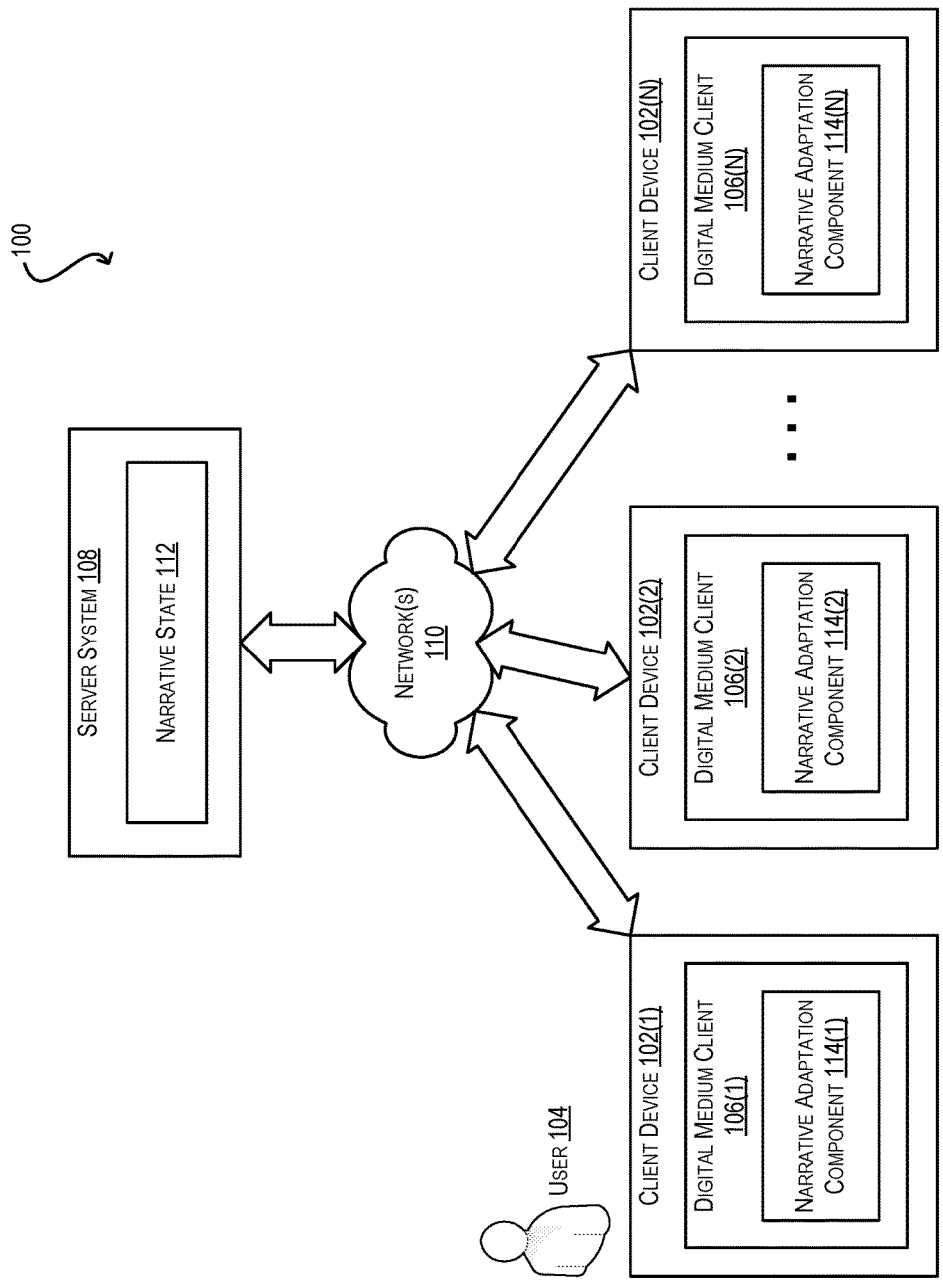
FIG. 1 depicts a system environment according to an embodiment.

FIG. 1 depicts a system environment 100 in which embodiments of the present disclosure may be implemented. As shown, system environment 100 includes a number of client devices 102(1)-(N) that are owned and/or operated by a user 104. Each client device 102 is an electronic device or system (e.g., a desktop/laptop computer, a game console, a smartphone, a tablet, etc.) that incorporates a digital medium client 106. Each digital medium client 106 is, in turn, a software and/or hardware-based component that is configured to provide a platform through which narrative content, encoded in the form of a particular digital medium, can be delivered to and consumed by user 104. By way of example, digital medium client 106(1) may be a video player that is configured to deliver a narrative in the form of a digital video (e.g., a film or episodic series) for viewing by user 104, digital medium client 106(2) may be a video game application that is configured to deliver a narrative in the form of a video game for playing by user 104, digital medium client 106(3) may be an e-book reader that is configured to deliver a narrative in the form of an electronic book for reading by user 104, and so on.

While digital narratives are often conveyed via a single medium, in some cases a content creator may produce a hybrid-media narrative that spans multiple different types of digital media. For instance, returning to the example above, a content creator may produce a hybrid-media narrative whose plot is developed/advanced through a combination of the digital video delivered via the video player of client device 102(1), the video game delivered via the video game application of client device 102(2), and the electronic book delivered via the e-book reader of client device 102(3). However, as noted in the Background section, existing approaches for implementing such hybrid-media narratives generally fail to tie together the user's interaction with each media type into a singular and cohesive user experience.

To address this deficiency, system environment 100 includes a novel server system 108 that is communicatively coupled with client devices 102(1)-(N) (via, e.g., one or more networks 110) and is configured to maintain an overall narrative state 112 for a hybrid-media narrative to be presented to user 104 via digital medium clients 106(1)-(N). In addition, each digital medium client 106 is configured to include a novel narrative adaptation component 114.

As described in further detail below, when user 104 consumes or modifies the hybrid-media narrative via a first digital medium client, server system 108 can update its stored narrative state 112 to reflect the consumed/modified portion. At a later time, when user 104 attempts to access the same narrative via a second digital medium client different from the first digital medium client, the narrative adaptation component of the second digital medium client can retrieve the most recent version of narrative state 112 from server system 108 (which includes the updates caused by the user's consumption of the narrative via the first digital medium client), inspect the retrieved state, and then dynamically adapt, using one or more rules, the second digital medium client's presentation of the narrative to user 104 in view of the retrieved state. For instance, if user 104 previously viewed a particular plot point via the first digital medium client, the second digital medium client may modify the subsequent presentation of the narrative to user 104 in a way that avoids repeating that same plot point, or assumes that user 104 is aware the plot point has already transpired. In this manner, user 104 can be provided a sense of continuity when consuming the hybrid-media narrative across the various media types.

It should be appreciated that system environment 100 of FIG. 1 is illustrative and not intended to limit the embodiments described herein. For example, although each client device 102 is shown as including a single digital medium client 106, in some embodiments a particular client device 102 may include several different digital medium clients (e.g., a video player and a video game application).

Further, although a single instance of narrative state 112 (specific to user 104) is shown as being maintained by server system 108, in practice server system 108 will typically maintain multiple instances of narrative state 112, each being associated with a different registered user (or group of users) of the system. One of ordinary skill in the art will recognize other variations, modifications, and alternatives.

2. Workflows

Figure 2:
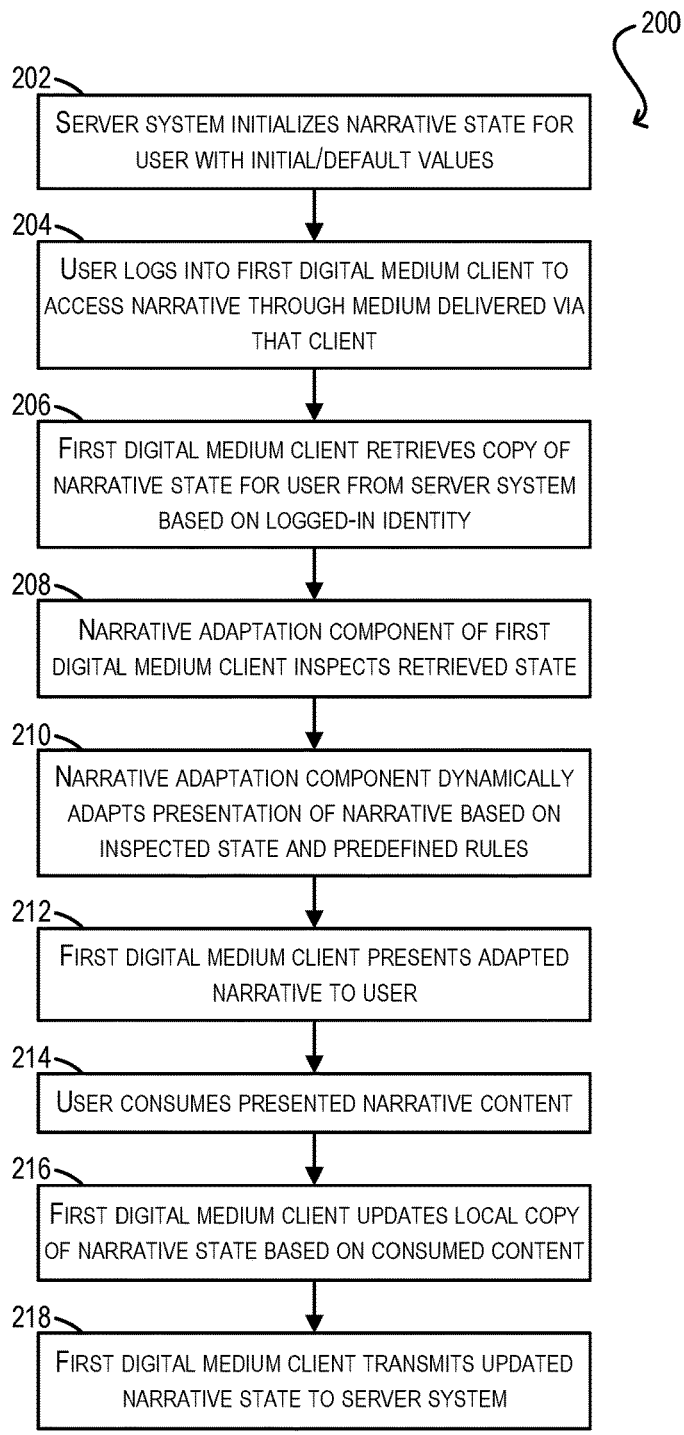
FIGS. 2 and 3 depict workflows for dynamically adapting the presentation of a narrative across different types of digital media according to an embodiment.
Figure 3:
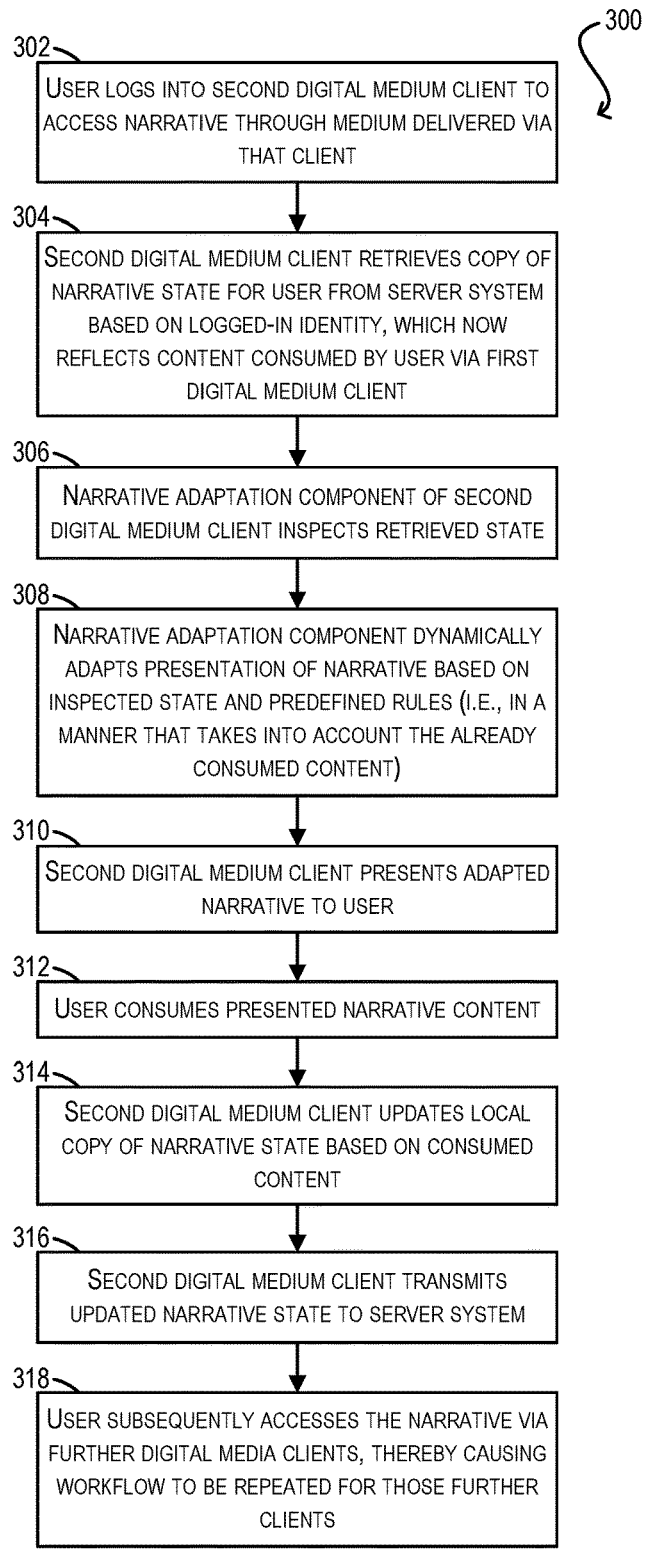

FIGS. 2 and 3 depict high-level workflows 200 and 300 that may be performed by server system 108 and client devices 102 of FIG. 1 for dynamic adapting the presentation of a hybrid-media narrative to user 104 across different types of digital media according to an embodiment.

Starting with block 202 of workflow 200 (FIG. 2), server system 108 can initialize narrative state 112, which reflects the state of the hybrid-media narrative for user 104, with initial or default values indicating that the state is "clean" (i.e., untouched by user 104). This step will typically be performed when user 104 first registers himself or herself with server system 108 and thus has not yet consumed any portion of the narrative via digital medium clients 106(1)-(N).

In one set of embodiments, narrative state 112 can be implemented as a key-value store comprising key-value pairs, where each key identifies a unit of content in the hybrid-media narrative (e.g., a conversation exchange between actors, a plot point or scene, etc.), and where each value indicates whether the content unit identified by the corresponding key has been presented to, and thus consumed by, user 104. In these embodiments, the initialization performed at block 202 can involve setting the value of each key-value pair in narrative state 112 to "FALSE" (or an equivalent value such as "NO," 0, etc.), thereby indicating that these units of content have not yet been consumed.

In alternative embodiments, narrative state 112 can be implemented using any other type of data structure known in the art (e.g., a relational database, etc.) that is capable of representing the narrative as a collection of content units and is capable of storing metadata for each content unit that reflects the unit's "consumed" status. In these alternative embodiments, the initialization performed at block 202 can involve setting this metadata with initial/default values using a mechanism that is appropriate for the data structure.

At block 204, user 104 can login to a first digital medium client 106(X) in order to access the narrative through the digital medium delivered via that client. For example, if digital medium client 106(X) is a video player, user 104 can login to client 106(X) in order to access the narrative as a digital video that is delivered through that video player application. In various embodiments, the login process can be implemented using a conventional approach whereby user 104 provides an indication of his/her identity (e.g., a registered user ID, email address, etc.) and security credentials (e.g., a password, PIN, etc.) to digital medium client 106(X), and client 106(X) subsequently authenticates user 104's identity using the supplied credentials. This authentication can be performed locally on the client device hosting client 106(X) or via communication with server system 108 (or a separate authentication server).

At blocks 206 and 208, digital medium client 106(X) can retrieve a copy of narrative state 112 from server system 108 based on user 104's logged-in identity and can inspect the retrieved state via its narrative adaptation component 114 (X). As part of block 208, narrative adaptation component 114(X) can determine which content units of the narrative have been consumed by user 104 by virtue of the metadata associated with each content unit in narrative state 112. In this particular example, since narrative state 112 is still "clean," narrative adaptation component 114(X) can determine that no content units have yet been consumed.

Then, at block 210, narrative adaptation component 114 (X) can dynamically adapt the presentation of the narrative to user 104 via client 106(X) based on the inspection performed at block 208 and one or more predefined rules specific to client 106(X). Generally speaking, this adaptation can take into account what portions of the narrative have already been consumed by user 104 (as indicated in narrative state 112) and can determine what portions of, and/or how, the narrative should be presented next to user 104 in order to provide a sense of story continuity. As mentioned previously, in this particular example narrative state 112 is still clean, and thus narrative adaptation component 114(X) may determine that the narrative should be presented from the very beginning of its story arc (since user 104 has not yet consumed any portion of the narrative).

At block 212, digital medium client 106(X) can present the narrative, in the form of its associated digital medium, to user 104 in accordance with the adaptation performed at block 210. For example, if digital medium client 106(X) is a video player application, client 106(X) may stream one or more video clips corresponding to the narrative's opening scene or episode. In response, user 104 can consume the presented content (block 214).

Finally, at blocks 216 and 218, digital medium client 106(X) can update its local copy of narrative state 112 based on the content consumed by user 104 and can transmit the updated copy to server system 108 for storage on that system. With these steps, server system 108 can be made aware of the consumed portions so that this information can be exploited by the other digital medium clients operated by user 104. In one set of embodiments, the updating of narrative state 112 at block 216 can comprise identifying the specific content units consumed by user 104 and setting the metadata associated with those content units to indicate a "consumed" status. For instance, in embodiments where narrative state 112 is implemented as a key-value store, this step can comprise identifying the key-value pairs corresponding to the consumed content units and setting the value of each identified key-value pair to "TRUE" or an equivalent value.

Further, the transmission of the updated narrative state at block 218 can comprise identifying the specific content units whose state has been updated per block 216 and sending those content units (and their associated metadata) to server system 108. This transmission may occur upon, e.g., user logout from digital medium client 106(X), and/or on a continuous basis as user 104 is consuming the presented narrative content. For example, digital medium client 106(X) may send updated state information to server system 108 each time user 104 consumes a content unit or passes a predefined checkpoint.

Turning now to workflow 300 (FIG. 3), at a later point in time, user 104 can login to a second digital medium client 106(Y) that is different from first digital medium client 106(X) in order to access the narrative through the digital medium delivered via client 106(Y) (block 302). For example, if digital medium client 106(Y) is a video game application, user 104 can login to client 106(Y) in order to access the narrative as a video game that is delivered through that application. Like block 204 of workflow 300, this login process can be implemented using a conventional user ID and credentials-based authentication approach.

At block 304, digital medium client 106(Y) can retrieve the most recent copy of narrative state 112 from server system 108 based on user 104's logged-in identity. Note that since user 104 has already accessed the narrative via digital medium client 106(X) per workflow 200, this retrieved copy of narrative state 112 will reflect the narrative content units that have been consumed by user 104 via that first client.

At block 306, narrative adaptation component 114(Y) of digital medium client 106(Y) can inspect the retrieved narrative state, thereby identifying the content units already consumed by user 104. Narrative adaptation component 114(Y) can then dynamically adapt the presentation of the narrative in view of that knowledge and one or more predefined rules specific to client 106(Y) (block 308). As mentioned previously, this adaptation step can specifically determine what portions of, and/or how, the narrative should be presented next to user 104 in order to provide a sense of story continuity. For instance, assume that user 104 viewed opening scene S1 via digital medium client 106(X) at block 214 of workflow 200. In this scenario, narrative adaptation component 114(Y) can modify client 106(Y)'s presentation of the narrative to, e.g., convey a subsequent piece of narrative content that follows from scene S1, or otherwise adapt the narrative in a manner that assumes user knowledge of S1.

In many cases, the adaptation rules applied at block 308 (as well as at analogous block 210 of workflow 200) will be tied in some fashion to the type of digital medium supported by the digital medium client. For example, if digital medium client 106(Y) is a video game application as mentioned above, the adaptation may involve modifications that are specific to the video game context (e.g., changing the game level the user may play, changing the attributes of the player character or environment, changing the attributes of non-player characters (NPCs), etc.). However, in certain alternative embodiments, the adaptation rules applied at blocks 308/210 may also comprise rules that are more generally applicable to a range of different digital media.

At block 310, digital medium client 106(Y) can present the narrative, in the form of its associated digital medium, to user 104 in accordance with the adaptation performed at block 308. In response, user 104 can consume the presented content (block 312).

Then, in a manner similar to blocks 216 and 218 of workflow 200, digital medium client 106(Y) can update its local copy of narrative state 112 based on the content consumed by user 104 (block 314) and can transmit the updated copy to server system 108 for storage on that system (block 316).

Finally, at block 318, user 104 can subsequently access the narrative via additional digital medium clients and workflow 300 can be repeated for those additional clients. In this way, narrative state 112 can be continually updated by each digital medium client based on what has been consumed by user 104 via that client, and this evolving narrative state can be exploited by each client to dynamically determine the narrative content that is presented next to the user. The end result of this overall process is that the narrative is conveyed in a cohesive and seamless manner to the user across the plurality of clients/mediums.

It should be appreciated that workflows 200 and 300 of FIGS. 2 and 3 are illustrative and various modifications are possible. For example, although workflows 200 and 300 indicate that the act of updating narrative state 112 is performed on the client side (i.e., by digital medium clients 106), in certain embodiments server system 108 may also directly modify/update narrative state 112 based on one or more server-side rules. This can be useful in scenarios where the logic for modifying narrative state 112 is dependent on aggregate user behavior (which is known only to server system 108 and not to clients 106), and/or scenarios where the narrative states for multiple users need to updated simultaneously based on some non-user-driven trigger. For instance, server system 108 may maintain a rule indicating that "the first 1000 users that consume content unit X will result in consequence Y; for any users after the 1000th user, consuming content unit X will result in consequence Z." In this case, since server system 108 maintains the narrative states of all registered users, it can determine when 1000 users have consumed X and can inject information into the narrative state of each user as appropriate (e.g., to reflect the occurrence of consequence Y or Z).

Further, although narrative state 112 has been generally described as comprising a collection of narrative content units (e.g., keys) and associated metadata for each content unit (e.g., values) reflecting the unit's consumed status, in certain embodiments, narrative state 112 may also include additional data/metadata relevant to the overall state of the narrative with respect to user 104. For example, in one embodiment, narrative state 112 can also include temporal information indicating the order in which certain content units have been consumed by user 104. This temporal information can be embodied in the form of, e.g., a timestamp that is associated with one or more content units. In another embodiment, in cases where the consumption of a particular content unit implies that user 104 did not consume one or more alternative content units (e.g., the user chose path A instead of mutually exclusive paths B or C), narrative state 112 can also include information identifying the relationships between these consumed and "unconsumed" content units. Narrative adaptation components 114 of digital medium clients 106 can take into account all, or any subset, of these additional pieces of data/metadata at the time of adapting narrative content for presentation to user 104.

3. Example Narrative State and Adaptation Rules

To further illustrate the techniques described herein, Table 1 below depicts a simplified example of a narrative state that may be maintained by server system 108 according to an embodiment. In this example, the narrative is a murder mystery and the narrative state is composed of four content units relevant to the murder, each of which is associated with a GUID (globally unique identifier), a description, and a bit flag indicating its consumed status (e.g., 1 for consumed, 0 for not consumed). These bit flags are initially set to 0, indicating that none of the content units have yet been consumed by the user.

TABLE 1

| GUID | Description | Bit Flag |
|------|-------------|----------|
| 1001 | Murder has occurred | 0 |
| 1002 | Body has been found | 0 |
| 1003 | Suspect ran away | 0 |
| 1004 | Murder investigation initiated | 0 |

In addition, Listings 1 and 2 below provide example adaptation rules that may be implemented by a video player and a video game application respectively for dynamically adapting the presentation of the narrative in view of the narrative state. It should be appreciated that these rules are presented in an exemplary pseudo-code format and, in practice, can be structured according to any programming or rule language known in the art.

Listing 1

```
IF bit flag(1001) == 0
    Show scene(s) leading up to, and including, murder
ELSE IF bit flag(1002) == 0
    Show scene of user discovery of body
ELSE show scene of murder investigation being initiated
```

Listing 2

```
IF bit flag(1001) == 0
    Play interactive game level preceding the murder
ELSE IF bit flag(1002) == 0
    Show noninteractive scene of user discovery of body
    Present user choice of staying at murder location or running away
    IF bit flag(1003) == 1
        Play interactive game level of escape sequence
    Show noninteractive scene of murder investigation being initiated
```

With the foregoing in mind, assume the user first logs into the video player. In response, the video player will download the narrative state associated with the user (as depicted in Table 1) and apply this state information to its adaptation rules (as depicted in Listing 1). Since the bit flag for content unit 1001 (i.e., "murder has occurred") is initially set to 0, video player will show the video scene(s) leading up to, and including, the murder to the user. In addition, the video player will update its local copy of the narrative state to change the bit flag for 1001 from 0 to 1 (since the user has now consumed this content unit).

Assume that the user subsequently logs off of the video player and logs into the video game application. In this case, the video player will transmit its updated copy of the narrative state to the server system, and the video game application will thereafter download the updated narrative state for the user to local storage. The video game application will then apply the updated state information to its adaptation rules as depicted in Listing 2. Since the bit flag for content unit 1001 is now set to 1, the video game application will skip the interactive game level preceding the murder and instead check whether the bit flag for content unit 1002 (i.e., "body has been found") is set to 0 (which it is). In response, the video game application will show a noninteractive scene of the user's discovery of the body (thereby updating the bit flag for 1002 from 0 to 1) and provide the user a choice to stay at the murder location or to run away.

If the user decides to run away, the video game application will update the bit flag for content unit 1003 (i.e., "suspect ran away") from 0 to 1, and as a result allow the user to play an interactive game level of an escape sequence. At the conclusion of this game level (or if the user decided not to run away), the video game application will show a noninteractive cutscene of the murder investigation being initiated. Then, the video game application will update its local copy of the narrative state to change the bit flag for 1004 from 0 to 1 (since the user has now consumed this content unit).

Finally, if the user subsequently logs off of the video game application, the video game application will transmit its updated copy of the narrative state to the server system. Thus, the updated narrative state can be further used/exploited by the video player, the video game application, and/or other digital medium clients the next time the user decides to access the narrative via one of those clients.

4. Example Computing Device/System

Figure 4:
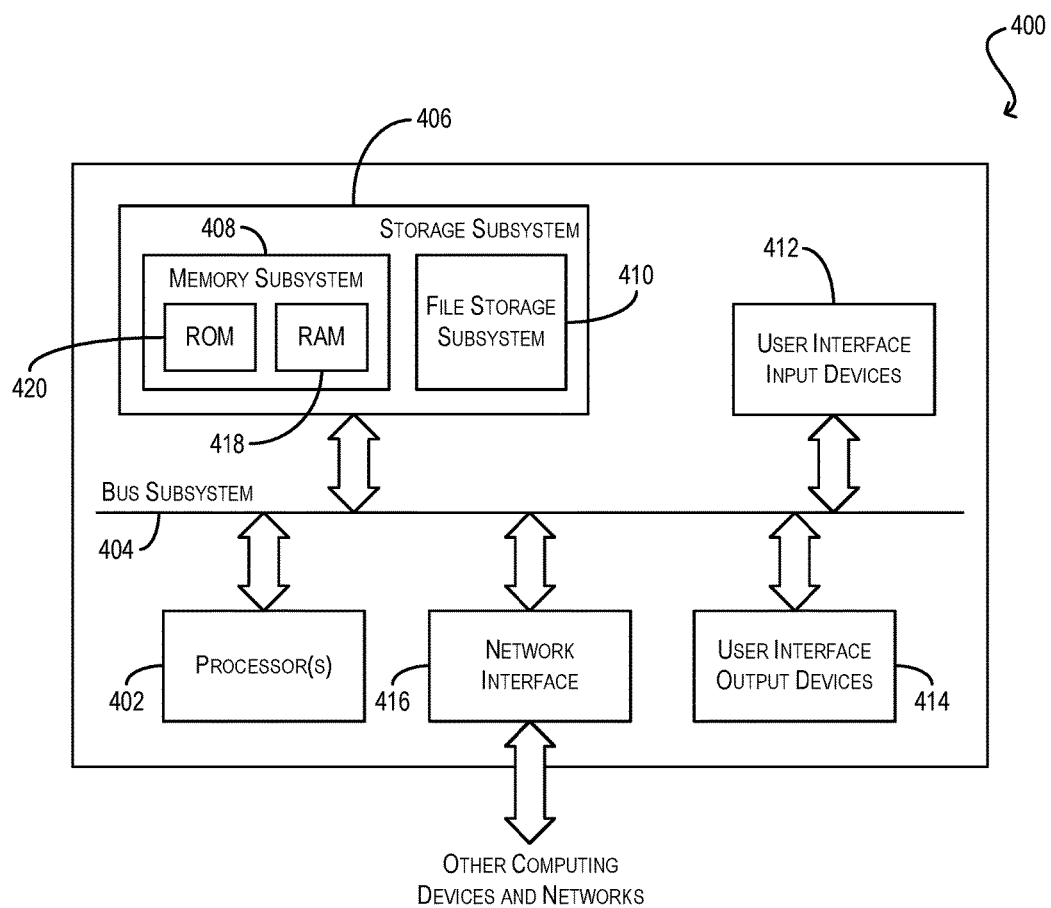
FIG. 4 depicts an example computing device/system according to an embodiment.

FIG. 4 depicts an example computing device/system 400 according to an embodiment. Computing device/system 400 may be used to implement, e.g., server system 108 or any of client devices 102(1)-(N) described in the foregoing sections.

As shown, computing device/system 400 can include one or more processors 402 that communicate with a number of peripheral devices via a bus subsystem 404. These peripheral devices can include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computing device/system 400 communicate with each other as intended. Although bus subsystem 404 is shown schematically as a single bus, alternative embodiments of the bus subsystem can utilize multiple busses.

Network interface subsystem 416 can serve as an interface for communicating data between computing device/system 400 and other computing devices or networks. Embodiments of network interface subsystem 416 can include wired (e.g., coaxial, twisted pair, or fiber optic Ethernet) and/or wireless (e.g., Wi-Fi, cellular, Bluetooth, etc.) interfaces.

User interface input devices 412 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computing device/system 400.

User interface output devices 414 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computing device/system 400.

Storage subsystem 406 can include a memory subsystem 408 and a file/disk storage subsystem 410. Subsystems 408 and 410 represent non-transitory computer-readable storage media that can store program code and/or data that provide the functionality of various embodiments described herein.

Memory subsystem 408 can include a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computing device/system 400 is illustrative and not intended to limit embodiments of the present disclosure. Many other configurations having more or fewer components than computing device/system 400 are possible.

The above description illustrates various embodiments of the present disclosure along with examples of how certain aspects may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
    maintaining, at a server system, a narrative state for a narrative to be presented to a user across a plurality of digital media; and
    in response to determining that the user has logged into a first client system, transmitting, by the server system, a copy of the narrative state to the first client system, wherein the first client system is configured to present the narrative to the user via a first digital medium in the plurality of digital media, and wherein upon receiving the copy of the narrative state, the first client system is configured to:
    adapt, based on the copy of the narrative state and one or more first rules, the first client system's presentation of the narrative to the user via the first digital medium, wherein the adapting takes into account information included in the copy of the narrative state that identifies portions of the narrative which have already been consumed by the user while operating a second client system different from the first client system, the second client system being configured to present the narrative via a second digital medium different from the first digital medium;
    update the copy of the narrative state based on portions of the narrative consumed by the user via the first client system; and
    upon determining that the user has logged out of the first client system, transmit the updated copy of the narrative state to the server system for storage on the server system.

2. The method of claim 1 wherein the narrative state includes a set of narrative content units and metadata associated with each narrative content unit indicating whether the narrative content unit has been consumed by the user.

3. The method of claim 2 wherein the narrative state is implemented as a key-value store, each narrative content unit being represented as a key in the key-value store and the metadata associated with the narrative content unit being represented as a corresponding value in the key-value store.

4. The method of claim 2 wherein each narrative content unit corresponds to a conversation exchange or scene within the narrative.

5. The method of claim 2 wherein adapting the presentation of the narrative comprises determining which portions of the narrative should be presented next to the user in view of the narrative content units that have already been consumed by the user.

6. The method of claim 2 wherein updating the copy of the narrative state comprises updating the metadata for each content unit consumed by the user to reflect its consumed status.

7. The method of claim 2 wherein the narrative state further includes a timestamp associated with each narrative content unit, the timestamp indicating a time at which the narrative content unit was consumed by the user.

8. The method of claim 2 wherein the narrative state further includes one or more links between related narrative content units.

9. The method of claim 1 further comprising:
    transmitting, by the server system, the updated copy of the narrative state to a third client system operated by the user, wherein the third client system is configured to present the narrative to the user via a third digital medium in the plurality of digital media that is different from the first digital medium and the second digital medium, and wherein upon receiving the copy of the narrative state, the third client system is configured to:
    adapt, based on the updated copy of the narrative state and one or more second rules, its presentation of the narrative to the user via the third digital medium, the adapting taking into account information in the updated copy of the narrative state identifying portions of the narrative previously consumed by the user via the first client system and the second client system.

10. The method of claim 9 wherein the third client system is further configured to:

further update the updated copy of the narrative state based on portions of the narrative consumed by the user via the third client system; and transmit the further updated copy of the narrative state to the server system for storage on the server system.

11. The method of claim 1 wherein transmitting the updated copy of the narrative state to the server system for storage on the server system comprises:

identifying, by the first client system, portions of the narrative consumed by the user via the first client system; and transmitting metadata associated with the identified portions to the server system, without transmitting any metadata associated with portions of the narrative not yet consumed by the user via the first client system.

12. The method of claim 1 wherein the server system is configured to modify the narrative state maintained on the server system based on aggregate behavior of a plurality of users.

13. The method of claim 1 wherein the server system is configured to modify the narrative state maintained on the server system based on a predefined non-user-driven trigger.

14. The method of claim 1 wherein the plurality of digital media include one or more of a digital video, a video game, an electronic book, a web site, or a virtual reality world.

15. The method of claim 1 wherein the first digital medium is a digital video and wherein the second digital medium is a video game.

16. The method of claim 1 wherein the server system is operated by a creator of the narrative.

17. A non-transitory computer readable storage medium having stored thereon program code executable by a server system, the program code causing the server system to:

maintain a narrative state for a narrative to be presented to a user across a plurality of digital media; and in response to determining that the user has logged into a first client system, transmit a copy of the narrative state to the first client system, wherein the first client system is configured to present the narrative to the user via a first digital medium in the plurality of digital media, and wherein upon receiving the copy of the narrative state, the first digital medium client is configured to:

adapt, based on the copy of the narrative state and one or more first rules, the first client system's presentation of the narrative to the user via the first digital medium, wherein the adapting takes into account information included in the copy of the narrative state that identifies portions of the narrative which have already been consumed by the user while operating a second client system different from the first client system, the second client system being configured to present the narrative via a second digital medium different from the first digital medium;

update the copy of the narrative state based on portions of the narrative consumed by the user via the first client system; and upon determining that the user has logged out of the first client system, transmit the updated copy of the narrative state to the server system for storage on the server system.

18. The non-transitory computer readable storage medium of claim 17 wherein the program code further causes the computer system to:

transmit the updated copy of the narrative state to a third client system operated by the user, wherein the third client system is configured to present the narrative to the user via a third digital medium in the plurality of digital media that is different from the first digital medium and the second digital medium, and wherein upon receiving the copy of the narrative state, the third client system is configured to:

adapt, based on the updated copy of the narrative state and one or more second rules, its presentation of the narrative to the user via the second digital medium, the adapting taking into account information in the updated copy of the narrative state identifying portions of the narrative previously consumed by the user via the first client system and the second client system.

19. A server system comprising:

a processor; and a memory having stored thereon program code that, when executed by the processor, causes the processor to:

maintain a narrative state for a narrative to be presented to a user across a plurality of digital media; and in response to determining that the user has logged into a first client system, transmit a copy of the narrative state to the first client system, wherein the first client system is configured to present the narrative to the user via a first digital medium in the plurality of digital media, and wherein upon receiving the copy of the narrative state, the first client system is configured to:

adapt, based on the copy of the narrative state and one or more first rules, the first client system's presentation of the narrative to the user via the first digital medium, wherein the adapting takes into account information included in the copy of the narrative state that identifies portions of the narrative which have already been consumed by the user while operating a second client system different from the first client system, the second client system being configured to present the narrative via a second digital medium different from the first digital medium;

update the copy of the narrative state based on portions of the narrative consumed by the user via the first client system; and upon determining that the user has logged out of the first client system, transmit the updated copy of the narrative state to the server system for storage on the server system.

20. The server system of claim 19 wherein the program code further causes the processor to:

transmit the updated copy of the narrative state to a third client system operated by the user, wherein the third client system is configured to present the narrative to the user via a third digital medium in the plurality of digital media that is different from the first digital medium and the second digital medium, and wherein upon receiving the copy of the narrative state, the third client system is configured to:

adapt, based on the updated copy of the narrative state and one or more second rules, its presentation of the narrative to the user via the third digital medium, the adapting taking into account information in the updated copy of the narrative state identifying portions of the narrative previously consumed by the user via the first client system and the second client system.

* * * * *